US012213043B2

United States Patent
Oboril et al.

(10) Patent No.: US 12,213,043 B2
(45) Date of Patent: Jan. 28, 2025

(54) TRANSMISSION LIMITED BEACON FOR TRANSPORTATION DEVICE SELECTION

(71) Applicant: Intel Corporation, Santa Clara, CA (US)

(72) Inventors: Fabian Oboril, Karlsruhe (DE); Frederik Pasch, Karlsruhe (DE); Cornelius Buerkle, Karlsruhe (DE); Bernd Gassmann, Straubenhardt (DE); Kay-Ulrich Scholl, Malsch (DE)

(73) Assignee: Intel Corporation, Santa Clara, CA (US)

( * ) Notice: Subject to any disclaimer, the term of this patent is extended or adjusted under 35 U.S.C. 154(b) by 839 days.

(21) Appl. No.: 17/130,596

(22) Filed: Dec. 22, 2020

(65) Prior Publication Data
US 2021/0112393 A1 Apr. 15, 2021

(51) Int. Cl.
*H04W 4/80* (2018.01)
*G06Q 20/32* (2012.01)
*H04W 4/029* (2018.01)

(52) U.S. Cl.
CPC ............ *H04W 4/80* (2018.02); *G06Q 20/322* (2013.01); *G06Q 20/3272* (2013.01); *G06Q 20/3278* (2013.01); *H04W 4/029* (2018.02)

(58) Field of Classification Search
CPC ...... H04W 4/80; H04W 4/029; G06Q 20/322; G06Q 20/3272; G06Q 20/3278
USPC ........................................................ 455/41.2
See application file for complete search history.

(56) References Cited

U.S. PATENT DOCUMENTS

| | | | |
|---|---|---|---|
| 2011/0009098 A1* | 1/2011 | Kong ..................... | G08G 1/202 455/457 |
| 2012/0101942 A1* | 4/2012 | Park ................... | G06Q 20/0457 705/40 |
| 2013/0054281 A1* | 2/2013 | Thakkar ............. | G06Q 30/0207 705/5 |
| 2020/0150646 A1* | 5/2020 | Sugimoto .............. | G06Q 50/40 |
| 2020/0401391 A1* | 12/2020 | Ucar ....................... | H04W 4/50 |
| 2021/0107519 A1* | 4/2021 | Gassmann ............. | G06Q 50/40 |

(Continued)

FOREIGN PATENT DOCUMENTS

| | | |
|---|---|---|
| CN | 108701377 | 10/2018 |
| CN | 110245937 | 9/2019 |

(Continued)

OTHER PUBLICATIONS

"Taiwanese Application Serial No. 110131241, Office Action mailed Nov. 21, 2022", w English Translation, 24 pgs.

(Continued)

*Primary Examiner* — April G Gonzales
(74) *Attorney, Agent, or Firm* — Schwegman Lundberg & Woessner, P.A.

(57) ABSTRACT

Mobility-as-a-Service (MaaS) provides technical solutions for technical problems facing this shift toward public and private vehicles for hire, including providing a platform for users to identify and select public transportation and private vehicles for hire. Users may plan and book transportation services through a MaaS platform, such as a smartphone application. Technical solutions described herein include improved identification and selection of a vehicle based on wireless communication, such as using Near-Field Communication (NFC), Bluetooth, Wi-Fi, and other wireless communication.

23 Claims, 5 Drawing Sheets

(56) References Cited

U.S. PATENT DOCUMENTS

| | | | | |
|---|---|---|---|---|
| 2022/0169258 A1* | 6/2022 | Samarthyam | ............ | H04L 67/12 |
| 2023/0300579 A1* | 9/2023 | Merwaday | .............. | B60L 53/67 |
| | | | | 701/423 |

FOREIGN PATENT DOCUMENTS

| | | |
|---|---|---|
| CN | 110490579 | 11/2019 |
| TW | I809485 | 7/2023 |
| WO | 2005013078 | 2/2005 |
| WO | 2022139906 | 6/2022 |

OTHER PUBLICATIONS

"International Application Serial No. PCT US2021 051066, International Preliminary Report on Patentability mailed Jul. 6, 2023", 6 pgs.

"Taiwanese Application Serial No. 110131241, Response filed Feb. 16, 2023 to Office Action mailed Nov. 21, 2022", w English claims, 10 pgs.

"International Application Serial No. PCT US2021 051066, International Search Report mailed Jan. 3, 2022", 4 pgs.

"International Application Serial No. PCT US2021 051066, Written Opinion mailed Jan. 3, 2022", 4 pgs.

"Next-gen ticketing at IT-TRANS", [Online]. Retrieved from the Internet: URL: https: www.it-trans.org en about news next-gen-ticketing-at-it-trans.html, (Dec. 16, 2019), 4 pgs.

"E-Ticketing", [Online]. Retrieved from the Internet: URL: https: www.it-trans.org en_oldstructure it-trans the-exhibition topics-of-interest e-ticketing , 7 pgs.

Rapier, Graham, "Lyft wants to use augmented reality to make it easier to meet your driver", [Online]. Retrieved from the Internet: URL: https: www.businessinsider.com lyft-patent-application-augmented-reality-make-easier-find-driver-2019-1?r=DEandIR=T, (Jan. 17, 2019), 9 pgs.

Templeton, Brad, "Intel MobilEye Promises Self-Driving Robotaxi Service In 2022, While Others Back Off", (May 21, 2020), 5 pgs.

Struttgart, "Revolution in headlamp technology Mercedes shines in HD quality: Digital Light: dazzle free continuous main beam in the Mercedes: precision with resolution of more than 2 million pixels", https://media.daimler.com/marsMediaSite/en/instance/ko/Revolution-in-headlamp-technology-Mercedes-shines-in-HD-qual.xhtml?oid=14872032&Is=L2VuL2luc3RhbmNIL2tvLnhodG1sP29pZD00ODM2MjU4Jn, JIbElkPTYwODI5JmZyb21PaWQ9NDgzNjl1OCZib3JkZXJzPXRydWUmcmVzdWx0SW5mb1R5cGVJZD00MDYyNiZ2aWV3VHIwZT10aHVtYnNM!&rs=3, (Dec. 2, 2016), 4 pgs.

* cited by examiner

TRANSMISSION LIMITED BEACON FOR TRANSPORTATION DEVICE SELECTION

TECHNICAL FIELD

Embodiments described herein relate to automated vehicle control, and more specifically to selecting a transportation device using a transmission-limited beacon.

BACKGROUND

Transportation is increasingly shifting away from user-owned transportation and toward public transportation and private vehicles for hire. These public and private vehicles may include buses, trains (e.g., trams), taxis, rideshare (e.g., vehicles for hire), autonomous vehicles (e.g. robotaxis), e-scooters, city-bikes, and other type of transportation. Vehicles may include driver-assistance technology, and may provide partially or fully autonomous transportation. Driver-assistance technology may include various navigation sensors or systems, such as cameras, lidar, radar, Global Navigation Satellite Systems (e.g., GPS), or other navigation sensors or systems. Data provided by navigation sensors or systems may be processed by a navigational processor (e.g., CPU, GPU), which may relay input to a controller of a vehicle (e.g., braking system, steering system). Mobility-as-a-Service (MaaS) leverages partially or fully autonomous transportation to connect passengers to such vehicles, such as by facilitating reservations of e-scoters or robotaxis.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Wireless MaaS provides technical solutions for technical problems facing the shift toward public and private vehicles for hire, including providing a platform for users to identify and select public transportation and private vehicles for hire. Users may plan and book transportation services through a MaaS platform, such as a smartphone application. Technical solutions described herein include improved identification and selection of a vehicle based on wireless communication, such as using Bluetooth beacons, Wi-Fi beacons, Near-Field Communication (NFC) beacons, and other wireless communication.

In the following description, for purposes of explanation, numerous specific details are set forth in order to provide a thorough understanding of some example embodiments. It will be evident, however, to one skilled in the art that the present disclosure may be practiced without these specific details.

Figure 1:
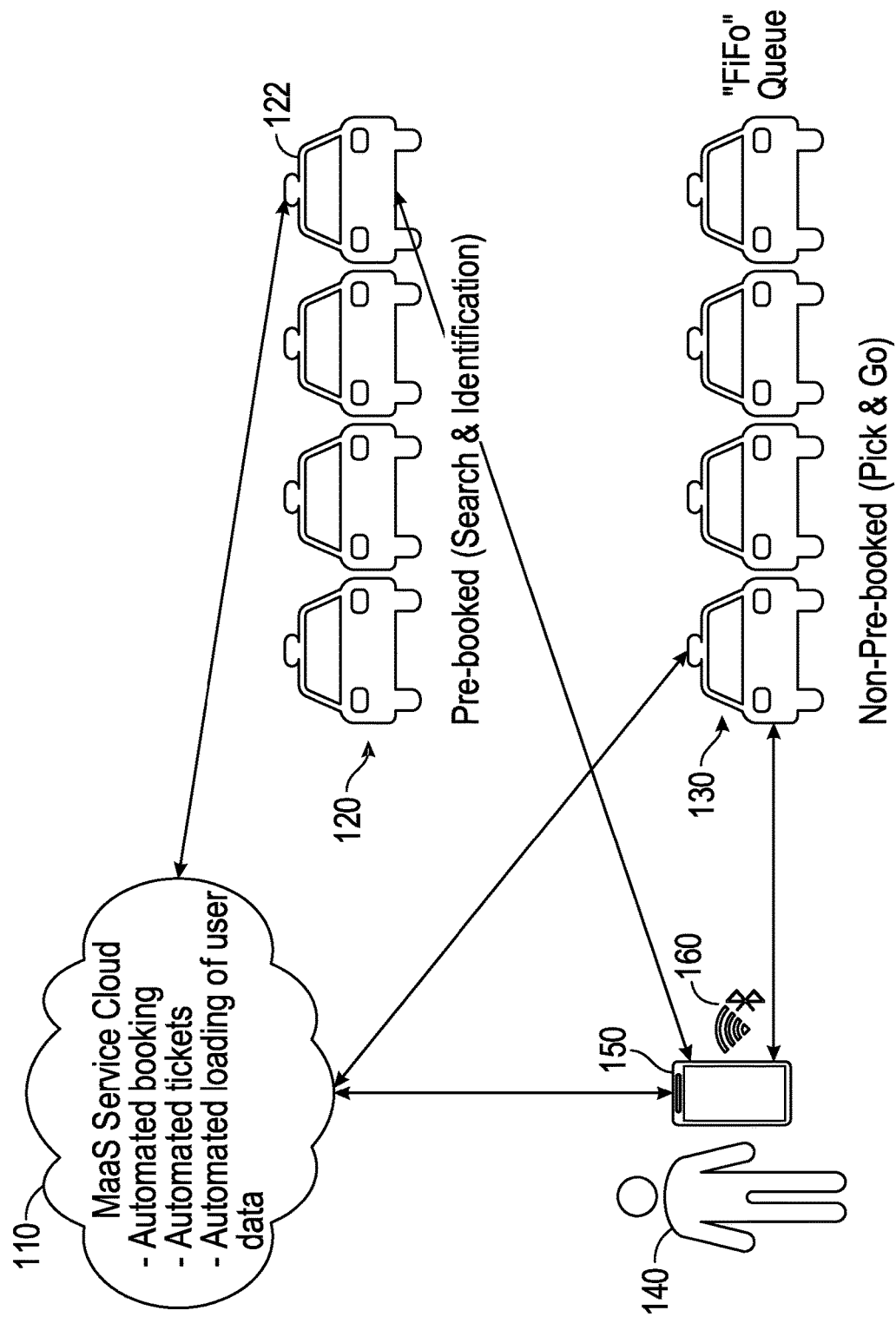
FIG. 1 is a schematic drawing illustrating a MaaS system, according to an embodiment.

FIG. 1 is a schematic drawing illustrating a MaaS system 100, according to an embodiment. MaaS system 100 includes a MaaS service cloud 110, which may handle automated booking, automated ticketing, automated loading of user data, and other mobility services. The MaaS service cloud 110 may provide the ability to book and manage one or more transportation modalities, including pre-booked transportation services 120 and non-pre-booked transportation services 130. The MaaS service cloud 110 may interact with a user 140 through a MaaS booking application on a user's mobile electronic device (e.g., smartphone) 150, where the device 150 provides wireless communication 160 such as Wi-Fi, Bluetooth, or other wireless communication.

The MaaS system 100 may be used to dynamically detect, book, and manage transportation devices (e.g., vehicles) as part of a MaaS trip, such as by using the wireless communication 160 to facilitate and automate identification and selection of a transportation device. This may enable the user 140 to identify a vehicle without manually activating an identification in a MaaS booking application or searching in the application for the correct vehicle license plate. Instead of a user performing a manual activation or vehicle search, the device 150 configures the wireless communication 160 to connect with the pre-booked vehicle or vehicles available for selection. This may be used to facilitate identification and selection of a vehicle, transfer of destination and other user-specific data, and other services.

When using pre-booked transportation services 120, this may include causing the pre-booked transportation device 122 to show unique user-selected audio-visual signals to facilitate selecting the correct vehicle. When using non-pre-booked transportation services 130, this may include automated triggering of device selection, such as registration, ticketing, booking, routing, and other services. For e-scooters and other non-pre-booked transportation services 130 that are controlled by the user 140, this enables the user 140 to select any of the available devices and start using the vehicle, and rely on the device 150 to communicate automatically with the MaaS service cloud 110 to initiate and end the trip and provide all relevant ticketing and other data. For rideshare and other non-pre-booked transportation services 130 that are controlled by a third-party driver, the user 140 may select any of the available devices and rely on the device 150 to communicate automatically with the MaaS service cloud 110 to authorize the user 140 and instruct the driver of the destination.

Figure 2:
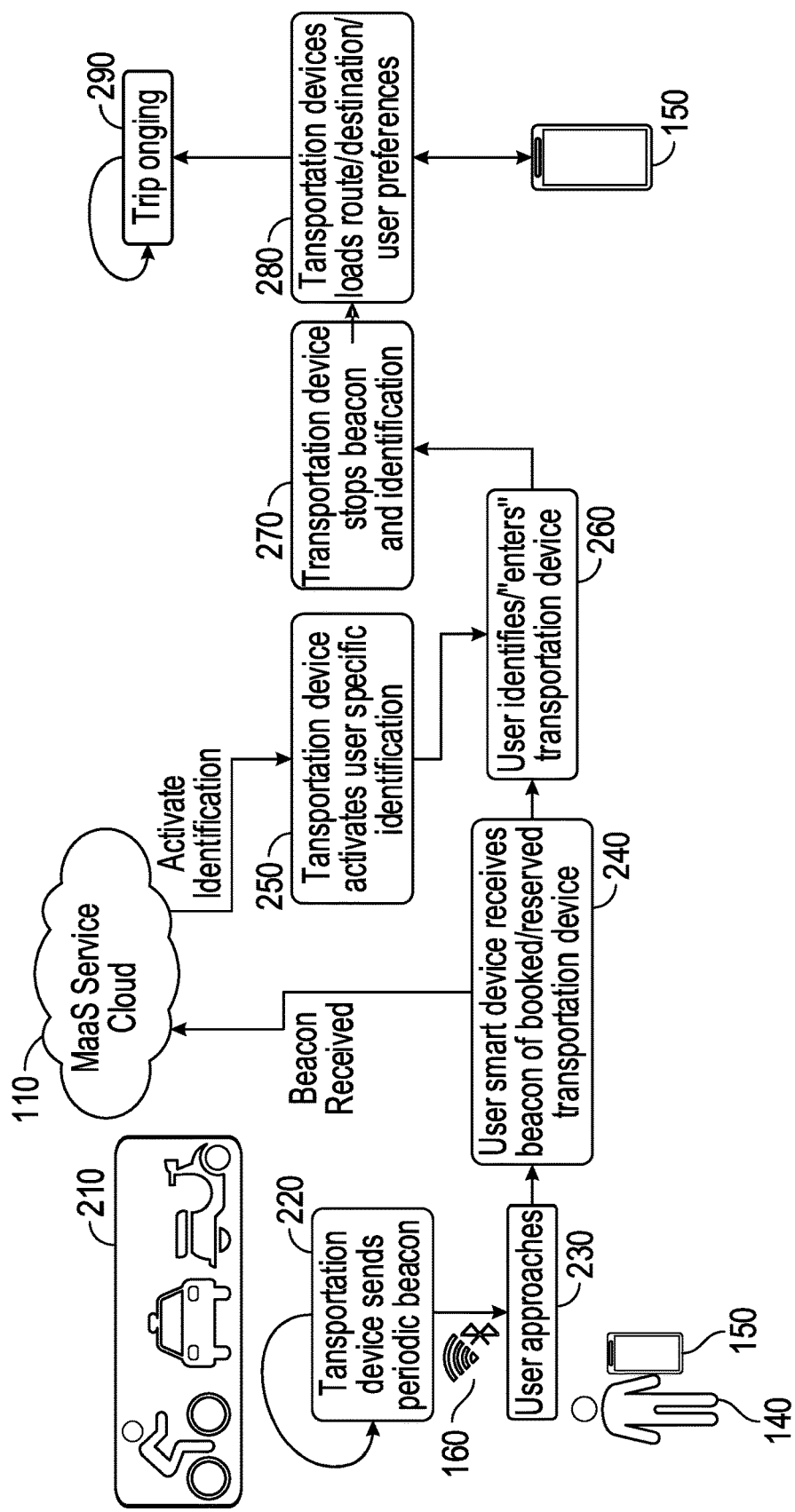
FIG. 2 is a schematic drawing illustrating a pre-booked MaaS system, according to an embodiment.

FIG. 2 is a schematic drawing illustrating a pre-booked MaaS system 200, according to an embodiment. Pre-booked MaaS system 200 may be used to enable user-specific device identification to facilitate selection of a pre-booked MaaS device, such as pre-booked e-scooters, city-bikes, robotaxis, or other pre-booked devices. This identification and selection of a pre-booked MaaS transportation device enables a user to identify the pre-booked device from among a group of devices.

Pre-booked MaaS system 200 includes one or more transportation devices 210. Each transportation device will include a wireless radio device, and when a transportation device is registered to be part of a user trip, the transportation device 210 and user's smartphone 150 participate in a beacon exchange by sending periodic wireless beacons 220 from the transportation device 210 to the user's smartphone 150. These wireless beacons 220 may include a wireless radio range-limited connection between user's smartphone 150 and one or more transportation devices 210. As soon as a user 140 approaches within a certain distance of the transportation device 230, the user's smartphone 150 may receive the beacon 240 of the pre-booked transportation device.

Once the beacon is received 240, the user device 150 may send the beacon to the MaaS service cloud 110. The MaaS service cloud 110 may confirm the identity of the user 140, the availability of the vehicle 210, the compatibility of the user's trip request with the vehicle capabilities (e.g., sufficient vehicle charge for the trip distance), or other information. Once confirmed, the MaaS service cloud 110 may send a command to the transportation device to activate an identification of the transportation device. The transportation device may activate a user-specific identification 250 that the user 140 can see or hear. The identification may include flashing lights, broadcasting a sound (e.g., playing a certain anthem), displaying a text message or avatar (e.g., on an LCD mounted to the device), projecting holographic elements into the air, projecting a laser image onto the ground, or other identification. The user 140 may use smartphone 150 to augment the user-specific identification 250, such as by recognizing audio or performing image recognition on the vehicle or a displayed or projected image and directing the user 140 toward the vehicle. The smartphone 150 may provide additional indications of the vehicle location in response to recognizing the user-specific identification 250, such as an augmented reality display highlighting the target vehicle, a compass direction, a map, or other indication.

The MaaS system 200 may detect when the user confirms the vehicle has been identified 260, such as when the user enters the vehicle or otherwise begins the trip. The vehicle identification 260 may be based on opening a vehicle door, detection of when the smartphone 150 is within the vehicle, when a steering wheel or handlebar is touched, or based on other vehicle-user interactions. Upon identification 260, the vehicle may stop transmitting the beacon and the identification 270.

Before starting the trip, the transportation device will receive all available user information 280, such as destination, route, user-specific settings such as comfort, radio station, and other user information. During the ongoing trip 290, the transportation device, smartphone 150, and MaaS service cloud 110 may communicate to update ongoing transportation information, such as time to destination, cost, recommended train door exit, or other transportation information.

Figure 3:
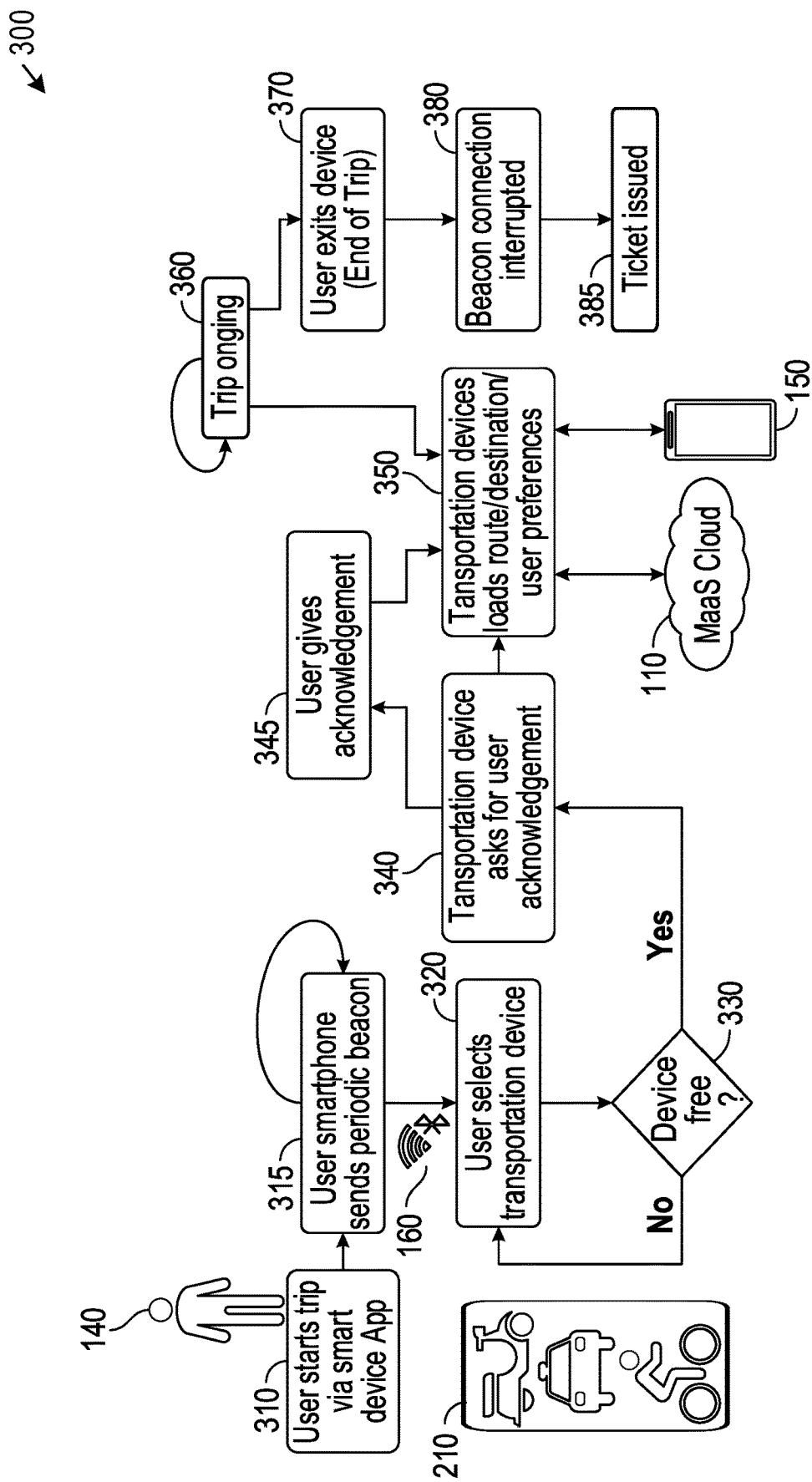
FIG. 3 is a schematic drawing illustrating a non-pre-booked MaaS system, according to an embodiment.

FIG. 3 is a schematic drawing illustrating a non-pre-booked MaaS system 300, according to an embodiment. Non-pre-booked MaaS system 300 may be used to enable a user to select one specific transportation device from among a pool of devices. Before starting a non-pre-booked trip, the user 140 may use a MaaS booking application or otherwise communicate with the MaaS service provider, such as to indicate a vehicle type preference, a geographic preference, an expected trip duration, or other user or trip information.

To begin a trip, the user 140 may use the MaaS booking application to initiate the trip 310. Once this trip is registered, the user's smartphone 150 and nearby vehicles 210 participate in a beacon exchange by sending periodic wireless beacons 220 from the user's smartphone 150 to nearby vehicles 315. User 140 may indicate a transportation device selection 320, such as by approaching or boarding the transportation device. When the transportation device includes a train or other multi-person transportation device, the user 140 may indicate selection by entering the transportation device, and the transportation device may use the beacon or other sensor to detect that the user 140 is within the transportation device. In an example, when the transportation device includes a bus or other stop-on-demand vehicle, the human or automated driver may be notified about the desired exit point such that the bus will stop without any user input, and the user 140 may be provided real-time information about the time or number of stops before reaching the destination.

When the transportation device includes an e-scooter or other single-person transportation device, the device may confirm that it is free 330 and not yet booked by another party. In an example, the user 140 may indicate a selection of a device (e.g., via proximity or touching a handlebar), and a message may be shown on the transportation device indicating whether the transportation device is available. If the transportation device is available, the transportation device may request a user acknowledgement 340. The user 140 may provide acknowledgement 345, such as by entering the device, by selecting a confirmation on a touch display on the transportation device (e.g. in-vehicle infotainment of a robotaxi), by sending a message to the user's smartphone MaaS booking application, or another acknowledgement.

Once the trip is acknowledged, the transportation device may receive user-specific information 350 from the MaaS cloud 110 or the user smartphone 150. This user-specific information may include trip information such as destination or route, and may include user-specific settings such as climate control or radio station. The transportation device may also send information to the MaaS cloud 110 or the user smartphone 150, such as trip progress, trip cost, or other trip information.

While the trip is ongoing 360, the smartphone 150 may continue to broadcast or exchange wireless beacons with the transportation device. These beacons may provide an indication that the two smartphone 150 and selected transportation device 210 are in proximity without requiring two-way communication. The beacons may be used to confirm the trip is ongoing 360, such as in the case of trains or another multi-person transportation device. In a multi-person example, if a separate passenger has not initiated the trip 310, that passenger's smart device will not send these beacons, and that passenger will not receive the acknowledgement request. Even if multiple passengers began a trip around the same time or location, the beacons can be used to detect when each passenger exits the vehicle or otherwise ends their trip. In case of ridesharing (e.g., shared use of a single robotaxi), two or more users could share the cost of the portion of the trip that is shared.

To end the trip, the user may provide a trip end indication, such as exiting the vehicle 370. The exit may be detected based on the beacons, such as by detecting whether a user is within a vehicle or whether the user is far enough from the vehicle to interrupt the beacon connection 380. Once the trip has ended, the user may be issued a ticket 385 or other fees for the use of the transportation device. The ticket may be paid automatically, may be modified via a user interaction with the MaaS booking application (e.g., to leave a tip), invoiced, or handled through another automated or interactive payment.

Figure 4:
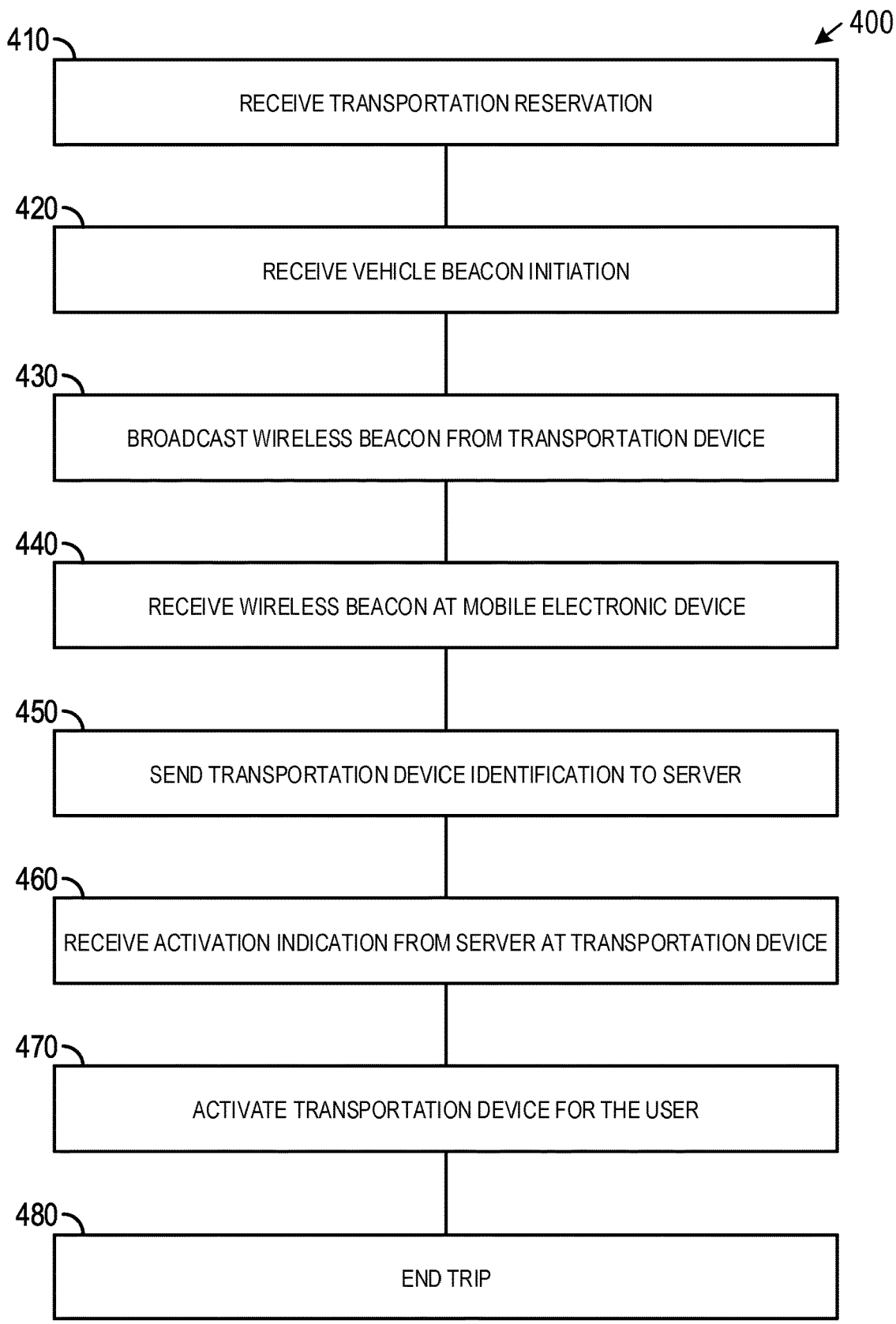
FIG. 4 is a schematic drawing illustrating a MaaS method, according to an embodiment.

FIG. 4 is a schematic drawing illustrating a MaaS method 400, according to an embodiment. Method 400 may include receiving 410 a transportation reservation from a mobile electronic device at a MaaS server. Method 400 may include receiving 420 a vehicle beacon initiation from the mobile electronic device at the transportation device. The vehicle beacon initiation may be based on a user input or based on a determination that the mobile electronic device is within the transportation device area. Method 400 may include broadcasting 430 the wireless beacon from the transportation device, which may be in response to the vehicle beacon initiation.

Method 400 may include receiving 440 the wireless beacon at the mobile electronic device. Method 400 may include sending 450 an identification of the transportation device to the MaaS server based on the wireless beacon. Method 400 may include receiving 460 an activation indication from the MaaS server at the transportation device in response to sending the identification of the transportation device. Method 400 may include activating 470 the transportation device for the user based on the activation indication. Method 400 may include ending 480 the trip. Ending 480 the trip may be based on a user interaction, a beacon connection interruption, or other indication, and may be followed by an automated billing for the trip.

Figure 5:
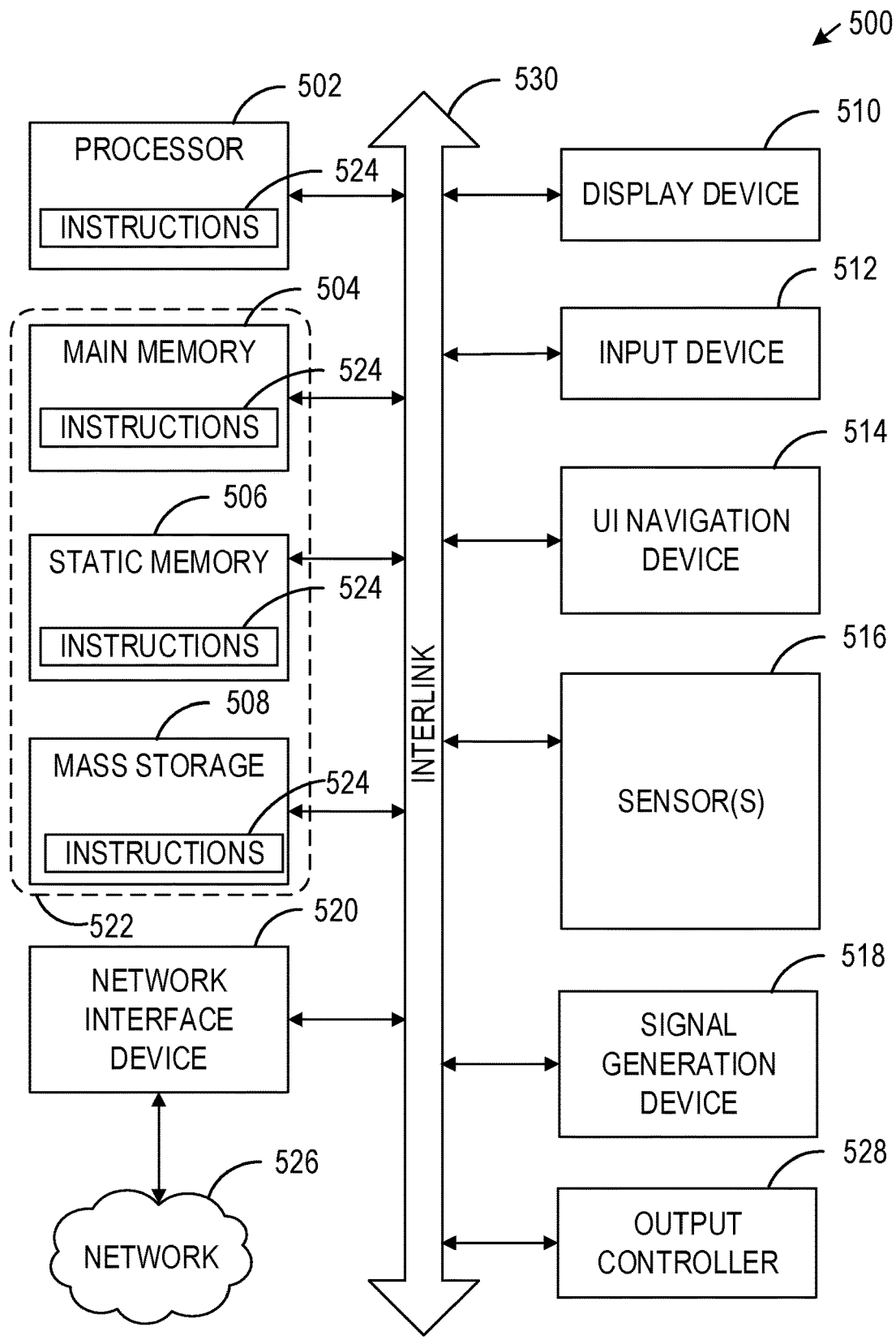
FIG. 5 is a block diagram illustrating a machine in the example form of a computer system, within which a set or sequence of instructions may be executed to cause the machine to perform any one of the methodologies discussed herein, according to an embodiment.

FIG. 5 is a block diagram illustrating a machine in the example form of a computer system 500, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, gyroscope sensor, inertial sensor, magnetometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Example 1 is a Mobility-as-a-Service system, the system comprising: a transportation device, including: a wireless radio device to participate in a wireless beacon exchange, the beacon exchange including exchanging a wireless beacon between the transportation device and mobile electronic device of a user; processing circuitry; and a memory that includes, instructions, the instructions, when executed by the processing circuitry, cause the processing circuitry to: send an identification of the transportation device from the transportation device to a server based on the wireless beacon; receive an activation indication from the server at the transportation device in response to sending the identification of the transportation device; and activate the transportation device for the user based on the activation indication.

In Example 2, the subject matter of Example 1 includes, the transportation device further including an activation notification device, the instructions further causing the processing circuitry to cause the activation notification device to uniquely identify the transportation device.

In Example 3, the subject matter of Example 2 includes, wherein the activation indication includes at least one of a flashing light, a broadcast sound, a displayed text message, a displayed image, a projected holographic element, or a projected laser image.

In Example 4, the subject matter of Examples 1-3 includes, wherein the wireless beacon exchange includes instructions further causing the processing circuitry to: receive an indication of a transportation reservation from the server, the transportation reservation received from the mobile electronic device at the server; and broadcast the wireless beacon from the transportation device based on a transportation reservation received from the mobile electronic device at the server.

In Example 5, the subject matter of Example 4 includes, wherein the wireless beacon exchange includes instructions further causing the processing circuitry to receive a vehicle beacon initiation from the mobile electronic device at the transportation device, wherein the broadcast of the wireless beacon is responsive to the receiving of the vehicle beacon initiation.

In Example 6, the subject matter of Example 5 includes, wherein the wireless beacon exchange includes instructions further causing the processing circuitry to receive a vehicle beacon initiation from the mobile electronic device at the transportation device in response to the receiving of the vehicle beacon initiation, wherein the mobile electronic device sends the vehicle beacon initiation in response to receiving a vehicle beacon activation from the user at the mobile electronic device.

In Example 7, the subject matter of Examples 5-6 includes, wherein the wireless beacon exchange includes instructions further causing the processing circuitry to: determine the mobile electronic device is within a transportation device area; and cause the vehicle beacon initiation to be sent from the mobile electronic device in response to the determination that the mobile electronic device is within the transportation device area.

In Example 8, the subject matter of Examples 4-7 includes, wherein the activation of the transportation device is further based on a user confirmation received at the mobile electronic device.

In Example 9, the subject matter of Example 8 includes, the instructions further causing the processing circuitry to stop the broadcast of the wireless beacon in response to the user confirmation of the activation indication.

In Example 10, the subject matter of Examples 1-9 includes, wherein the wireless beacon exchange includes instructions further causing the processing circuitry to receive the wireless beacon broadcasted from the mobile electronic device, wherein the wireless beacon is broadcasted responsive to receiving a mobile device beacon activation from the user at the mobile electronic device.

In Example 11, the subject matter of Example 10 includes, wherein the wireless beacon exchange includes instructions further causing the processing circuitry to receive a vehicle selection at the transportation device from the user at the mobile electronic device.

In Example 12, the subject matter of Examples 10-11 includes, the instructions further causing the processing circuitry to: determine a trip has been at least partially completed; identify a beacon connection interruption subsequent to the determination that the trip has been at least partially completed; and determine the trip has been completed based on the beacon connection interruption.

In Example 13, the subject matter of Examples 1-12 includes, the instructions further causing the processing circuitry to: receive an indication that a trip has been completed; determine a trip cost; and initiate an automated trip payment based on the trip cost.

In Example 14, the subject matter of Example 13 includes, the instructions further causing the processing circuitry to determine that the trip was associated with a rideshare trip, wherein determining the trip cost is based on dividing the trip cost among a plurality of passengers.

In Example 15, the subject matter of Examples 1-14 includes, the instructions further causing the processing circuitry to receive a set of trip information at the transportation device, the set of trip information including at least one of a transportation route, a transportation destination, or a set of user preferences.

Example 16 is at least one non-transitory machine-readable storage medium, comprising a plurality of instructions that, responsive to being executed with processor circuitry of a computer-controlled device, cause the processing circuitry to: participate in a wireless beacon exchange, the beacon exchange including exchanging a wireless beacon between the transportation device and mobile electronic device of a user; send an identification of the transportation device from the transportation device to a server based on the wireless beacon; receive an activation indication from the server at the transportation device in response to sending the identification of the transportation device; and activate the transportation device for the user based on the activation indication.

In Example 17, the subject matter of Example 16 includes, wherein the transportation device includes an activation notification device, the instructions further causing the processing circuitry to cause an activation notification device to uniquely identify the transportation device.

In Example 18, the subject matter of Example 17 includes, wherein the activation indication includes at least one of a flashing light, a broadcast sound, a displayed text message, a displayed image, a projected holographic element, or a projected laser image.

In Example 19, the subject matter of Examples 16-18 includes, wherein the wireless beacon exchange includes instructions further causing the processing circuitry to: receive an indication of a transportation reservation from the server, the transportation reservation received from the mobile electronic device at the server; and broadcast the wireless beacon from the transportation device based on a transportation reservation received from the mobile electronic device at the server.

In Example 20, the subject matter of Example 19 includes, wherein the wireless beacon exchange includes instructions further causing the processing circuitry to receive a vehicle beacon initiation from the mobile electronic device at the transportation device, wherein the broadcast of the wireless beacon is responsive to the receiving of the vehicle beacon initiation.

In Example 21, the subject matter of Example 20 includes, wherein the wireless beacon exchange includes instructions further causing the processing circuitry to receive a vehicle beacon initiation from the mobile electronic device at the transportation device in response to the receiving of the vehicle beacon initiation, wherein the mobile electronic device sends the vehicle beacon initiation in response to receiving a vehicle beacon activation from the user at the mobile electronic device.

In Example 22, the subject matter of Examples 20-21 includes, wherein the wireless beacon exchange includes instructions further causing the processing circuitry to: determine the mobile electronic device is within a transportation device area; and cause the vehicle beacon initiation to be sent from the mobile electronic device in response to the determination that the mobile electronic device is within the transportation device area.

In Example 23, the subject matter of Examples 19-22 includes, wherein the activation of the transportation device is further based on a user confirmation received at the mobile electronic device.

In Example 24, the subject matter of Example 23 includes, the instructions further causing the processing circuitry to stop the broadcast of the wireless beacon in response to the user confirmation of the activation indication.

In Example 25, the subject matter of Examples 16-24 includes, wherein the wireless beacon exchange includes instructions further causing the processing circuitry to receive the wireless beacon broadcasted from the mobile electronic device, wherein the wireless beacon is broadcasted responsive to receiving a mobile device beacon activation from the user at the mobile electronic device.

In Example 26, the subject matter of Example 25 includes, wherein the wireless beacon exchange includes instructions further causing the processing circuitry to receive a vehicle selection at the transportation device from the user at the mobile electronic device.

In Example 27, the subject matter of Examples 25-26 includes, the instructions further causing the processing circuitry to: determine a trip has been at least partially completed; identify a beacon connection interruption subsequent to the determination that the trip has been at least partially completed; and determine the trip has been completed based on the beacon connection interruption.

In Example 28, the subject matter of Examples 16-27 includes, the instructions further causing the processing circuitry to: receive an indication that a trip has been completed; determine a trip cost; and initiate an automated trip payment based on the trip cost.

In Example 29, the subject matter of Example 28 includes, the instructions further causing the processing circuitry to determine that the trip was associated with a rideshare trip, wherein determining the trip cost is based on dividing the trip cost among a plurality of passengers.

In Example 30, the subject matter of Examples 16-29 includes, the instructions further causing the processing circuitry to receive a set of trip information at the transportation device, the set of trip information including at least one of a transportation route, a transportation destination, or a set of user preferences.

Example 31 is a Mobility-as-a-Service method comprising: participating in a wireless beacon exchange, the beacon exchange including exchanging a wireless beacon between the transportation device and mobile electronic device of a user; sending an identification of the transportation device from the transportation device to a server based on the wireless beacon; receiving an activation indication from the server at the transportation device in response to sending the identification of the transportation device; and activating the transportation device for the user based on the activation indication.

In Example 32, the subject matter of Example 31 includes, wherein the transportation device includes an activation notification device, further including causing an activation notification device to uniquely identify the transportation device.

In Example 33, the subject matter of Example 32 includes, wherein the activation indication includes at least one of a flashing light, a broadcast sound, a displayed text message, a displayed image, a projected holographic element, or a projected laser image.

In Example 34, the subject matter of Examples 31-33 includes, wherein the wireless beacon exchange includes: receiving an indication of a transportation reservation from the server, the transportation reservation received from the mobile electronic device at the server; and broadcasting the wireless beacon from the transportation device based on a transportation reservation received from the mobile electronic device at the server.

In Example 35, the subject matter of Example 34 includes, wherein the wireless beacon exchange includes receiving a vehicle beacon initiation from the mobile electronic device at the transportation device, wherein the broadcast of the wireless beacon is responsive to the receiving of the vehicle beacon initiation.

In Example 36, the subject matter of Example 35 includes, wherein the wireless beacon exchange includes receiving a vehicle beacon initiation from the mobile electronic device at the transportation device in response to the receiving of the vehicle beacon initiation, wherein the mobile electronic device sends the vehicle beacon initiation in response to receiving a vehicle beacon activation from the user at the mobile electronic device.

In Example 37, the subject matter of Examples 35-36 includes, wherein the wireless beacon exchange includes: determining the mobile electronic device is within a transportation device area; and causing the vehicle beacon initiation to be sent from the mobile electronic device in response to the determination that the mobile electronic device is within the transportation device area.

In Example 38, the subject matter of Examples 34-37 includes, wherein the activation of the transportation device is further based on a user confirmation received at the mobile electronic device.

In Example 39, the subject matter of Example 38 includes, wherein the wireless beacon exchange includes stopping the broadcast of the wireless beacon in response to the user confirmation of the activation indication.

In Example 40, the subject matter of Examples 31-39 includes, wherein the wireless beacon exchange includes receiving the wireless beacon broadcasted from the mobile electronic device, wherein the wireless beacon is broadcasted responsive to receiving a mobile device beacon activation from the user at the mobile electronic device.

In Example 41, the subject matter of Example 40 includes, wherein the wireless beacon exchange includes receiving a vehicle selection at the transportation device from the user at the mobile electronic device.

In Example 42, the subject matter of Examples 40-41 includes, determining a trip has been at least partially completed; identifying a beacon connection interruption subsequent to the determination that the trip has been at least partially completed; and determining the trip has been completed based on the beacon connection interruption.

In Example 43, the subject matter of Examples 31-42 includes, receiving an indication that a trip has been completed; determining a trip cost; and initiating an automated trip payment based on the trip cost.

In Example 44, the subject matter of Example 43 includes, determining that the trip was associated with a rideshare trip, wherein determining the trip cost is based on dividing the trip cost among a plurality of passengers.

In Example 45, the subject matter of Examples 31-44 includes, receiving a set of trip information at the transportation device, the set of trip information including at least one of a transportation route, a transportation destination, or a set of user preferences.

Example 46 is at least one machine-readable medium including instructions, which when executed by a computing system, cause the computing system to perform any of the methods of Examples 31-43.

Example 47 is an apparatus comprising means for performing any of the methods of Examples 31-43.

Example 48 is a Mobility-as-a-Service apparatus comprising: means for participating in a wireless beacon exchange, the beacon exchange including exchanging a wireless beacon between the transportation device and mobile electronic device of a user; means for sending an identification of the transportation device from the transportation device to a server based on the wireless beacon; means for receiving an activation indication from the server at the transportation device in response to sending the identification of the transportation device; and means for activating the transportation device for the user based on the activation indication.

In Example 49, the subject matter of Example 48 includes, wherein the transportation device includes an activation notification device, further including means for causing an activation notification device to uniquely identify the transportation device.

In Example 50, the subject matter of Example 49 includes, wherein the activation indication includes at least one of a flashing light, a broadcast sound, a displayed text message, a displayed image, a projected holographic element, or a projected laser image.

In Example 51, the subject matter of Examples 48-50 includes, wherein the wireless beacon exchange includes: means for receiving an indication of a transportation reservation from the server, the transportation reservation received from the mobile electronic device at the server; and means for broadcasting the wireless beacon from the transportation device based on a transportation reservation received from the mobile electronic device at the server.

In Example 52, the subject matter of Example 51 includes, wherein the wireless beacon exchange includes means for receiving a vehicle beacon initiation from the mobile electronic device at the transportation device, wherein the broadcast of the wireless beacon is responsive to the receiving of the vehicle beacon initiation.

In Example 53, the subject matter of Example 52 includes, wherein the wireless beacon exchange includes means for receiving a vehicle beacon initiation from the mobile electronic device at the transportation device in response to the receiving of the vehicle beacon initiation, wherein the mobile electronic device sends the vehicle beacon initiation in response to receiving a vehicle beacon activation from the user at the mobile electronic device.

In Example 54, the subject matter of Examples 52-53 includes, wherein the wireless beacon exchange includes: means for determining the mobile electronic device is within a transportation device area; and means for causing the vehicle beacon initiation to be sent from the mobile electronic device in response to the determination that the mobile electronic device is within the transportation device area.

In Example 55, the subject matter of Examples 51-54 includes, wherein the activation of the transportation device is further based on a user confirmation received at the mobile electronic device.

In Example 56, the subject matter of Example 55 includes, wherein the wireless beacon exchange includes means for stopping the broadcast of the wireless beacon in response to the user confirmation of the activation indication.

In Example 57, the subject matter of Examples 48-56 includes, wherein the wireless beacon exchange includes means for receiving the wireless beacon broadcasted from the mobile electronic device, wherein the wireless beacon is broadcasted responsive to receiving a mobile device beacon activation from the user at the mobile electronic device.

In Example 58, the subject matter of Example 57 includes, wherein the wireless beacon exchange includes means for receiving a vehicle selection at the transportation device from the user at the mobile electronic device.

In Example 59, the subject matter of Examples 57-58 includes, means for determining a trip has been at least partially completed; means for identifying a beacon connection interruption subsequent to the determination that the trip has been at least partially completed; and means for determining the trip has been completed based on the beacon connection interruption.

In Example 60, the subject matter of Examples 48-59 includes, means for receiving an indication that a trip has been completed; means for determining a trip cost; and means for initiating an automated trip payment based on the trip cost.

In Example 61, the subject matter of Example 60 includes, means for determining that the trip was associated with a rideshare trip, wherein determining the trip cost is based on dividing the trip cost among a plurality of passengers.

In Example 62, the subject matter of Examples 48-61 includes, means for receiving a set of trip information at the transportation device, the set of trip information including at least one of a transportation route, a transportation destination, or a set of user preferences.

Example 63 is at least one machine-readable medium including instructions that, when executed by processing circuitry, cause the processing circuitry to perform operations to implement of any of Examples 1-62.

Example 64 is an apparatus comprising means to implement of any of Examples 1-62.

Example 65 is a system to implement of any of Examples 1-62.

Example 66 is a method to implement of any of Examples 1-62.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A Mobility-as-a-Service system, the system comprising:
   a transportation device, including:
   a wireless radio device to participate in a wireless beacon exchange, the beacon exchange including exchanging a wireless beacon between the transportation device and mobile electronic device of a user;
   processing circuitry; and a memory that includes instructions, the instructions, when executed by the processing circuitry, cause the processing circuitry to:

send an identification of the transportation device from the transportation device to a server based on the wireless beacon;

receive an activation indication from the server at the transportation device in response to sending the identification of the transportation device;

activate the transportation device for the user based on the activation indication;

receive an indication that a trip has been completed;

determine a trip cost; and initiate an automated trip payment based on the trip cost.

2. The system of claim 1, the transportation device further including an activation notification device, the instructions further causing the processing circuitry to cause the activation notification device to uniquely identify the transportation device.

3. The system of claim 2, wherein the activation indication includes at least one of a flashing light, a broadcast sound, a displayed text message, a displayed image, a projected holographic element, or a projected laser image.

4. The system of claim 1, wherein the wireless beacon exchange includes instructions further causing the processing circuitry to:

receive an indication of a transportation reservation from the server, the transportation reservation received from the mobile electronic device at the server; and broadcast the wireless beacon from the transportation device based on a transportation reservation received from the mobile electronic device at the server.

5. The system of claim 4, wherein the wireless beacon exchange includes instructions further causing the processing circuitry to receive a vehicle beacon initiation from the mobile electronic device at the transportation device, wherein the broadcast of the wireless beacon is responsive to the receiving of the vehicle beacon initiation.

6. The system of claim 5, wherein the wireless beacon exchange includes instructions further causing the processing circuitry to receive a vehicle beacon initiation from the mobile electronic device at the transportation device in response to the receiving of the vehicle beacon initiation, wherein the mobile electronic device sends the vehicle beacon initiation in response to receiving a vehicle beacon activation from the user at the mobile electronic device.

7. The system of claim 5, wherein the wireless beacon exchange includes instructions further causing the processing circuitry to:

determine the mobile electronic device is within a transportation device area; and cause the vehicle beacon initiation to be sent from the mobile electronic device in response to the determination that the mobile electronic device is within the transportation device area.

8. The system of claim 4, wherein the activation of the transportation device is further based on a user confirmation received at the mobile electronic device.

9. The system of claim 8, the instructions further causing the processing circuitry to stop the broadcast of the wireless beacon in response to the user confirmation of the activation indication.

10. The system of claim 1, wherein the wireless beacon exchange includes instructions further causing the processing circuitry to receive the wireless beacon broadcasted from the mobile electronic device, wherein the wireless beacon is broadcasted responsive to receiving a mobile device beacon activation from the user at the mobile electronic device.

11. The system of claim 10, wherein the wireless beacon exchange includes instructions further causing the processing circuitry to receive a vehicle selection at the transportation device from the user at the mobile electronic device.

12. The system of claim 10, the instructions further causing the processing circuitry to:

determine a trip has been at least partially completed;

identify a beacon connection interruption subsequent to the determination that the trip has been at least partially completed; and determine the trip has been completed based on the beacon connection interruption.

13. The system of claim 1, the instructions further causing the processing circuitry to determine that the trip was associated with a rideshare trip, wherein determining the trip cost is based on dividing the trip cost among a plurality of passengers.

14. At least one non-transitory machine-readable storage medium, comprising a plurality of instructions that, responsive to being executed with processing circuitry of a computer-controlled device, cause the processing circuitry to:

participate in a wireless beacon exchange, the beacon exchange including exchanging a wireless beacon between a transportation device and mobile electronic device of a user;

send an identification of the transportation device from the transportation device to a server based on the wireless beacon;

receive an activation indication from the server at the transportation device in response to sending the identification of the transportation device;

activate the transportation device for the user based on the activation indication;

receive an indication that a trip has been completed;

determine a trip cost; and initiate an automated trip payment based on the trip cost.

15. The non-transitory machine-readable storage medium of claim 14, wherein the transportation device includes an activation notification device, the instructions further causing the processing circuitry to cause an activation notification device to uniquely identify the transportation device.

16. The non-transitory machine-readable storage medium of claim 15, wherein the activation indication includes at least one of a flashing light, a broadcast sound, a displayed text message, a displayed image, a projected holographic element, or a projected laser image.

17. The non-transitory machine-readable storage medium of claim 14, wherein the wireless beacon exchange includes instructions further causing the processing circuitry to:

receive an indication of a transportation reservation from the server, the transportation reservation received from the mobile electronic device at the server; and broadcast the wireless beacon from the transportation device based on a transportation reservation received from the mobile electronic device at the server.

18. The non-transitory machine-readable storage medium of claim 17, wherein the wireless beacon exchange includes instructions further causing the processing circuitry to receive a vehicle beacon initiation from the mobile electronic device at the transportation device, wherein the broadcast of the wireless beacon is responsive to the receiving of the vehicle beacon initiation.

19. The non-transitory machine-readable storage medium of claim 18, wherein the wireless beacon exchange includes instructions further causing the processing circuitry to receive a vehicle beacon initiation from the mobile electronic device at the transportation device in response to the receiving of the vehicle beacon initiation, wherein the mobile electronic device sends the vehicle beacon initiation in response to receiving a vehicle beacon activation from the user at the mobile electronic device.

20. The non-transitory machine-readable storage medium of claim 18, wherein the wireless beacon exchange includes instructions further causing the processing circuitry to:
  determine the mobile electronic device is within a transportation device area; and
  cause the vehicle beacon initiation to be sent from the mobile electronic device in response to the determination that the mobile electronic device is within the transportation device area.

21. The non-transitory machine-readable storage medium of claim 14, wherein the wireless beacon exchange includes instructions further causing the processing circuitry to receive the wireless beacon broadcasted from the mobile electronic device, wherein the wireless beacon is broadcasted responsive to receiving a mobile device beacon activation from the user at the mobile electronic device.

22. The non-transitory machine-readable storage medium of claim 21, the instructions further causing the processing circuitry to:
  determine a trip has been at least partially completed;
  identify a beacon connection interruption subsequent to the determination that the trip has been at least partially completed; and
  determine the trip has been completed based on the beacon connection interruption.

23. The non-transitory machine-readable storage medium of claim 14, the instructions further causing the processing circuitry to determine that the trip was associated with a rideshare trip, wherein determining the trip cost is based on dividing the trip cost among a plurality of passengers.

\* \* \* \* \*